US009075803B2

(12) United States Patent
Cardoso et al.

(10) Patent No.: US 9,075,803 B2
(45) Date of Patent: Jul. 7, 2015

(54) SYSTEMS AND METHODS FOR USING MACHINE READABLE CODES TO STORE AND RETRIEVE REVERSIBLE WRITE ERASEABLE PAPER DOCUMENTS

(75) Inventors: George Cunha Cardoso, Webster, NY (US); Raja Bala, Pittsford, NY (US); Tonya L. Love, Rochester, NY (US); Francis K. Tse, Rochester, NY (US); Fritz F. Ebner, Pittsford, NY (US); Michael R. Furst, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 316 days.

(21) Appl. No.: 13/094,516

(22) Filed: Apr. 26, 2011

(65) Prior Publication Data

US 2012/0273562 A1   Nov. 1, 2012

(51) Int. Cl.
   *G06F 3/12*       (2006.01)
   *G06F 17/30*      (2006.01)
   *B41J 3/407*      (2006.01)
   *G03C 11/02*      (2006.01)

(52) U.S. Cl.
   CPC .......... *G06F 17/30011* (2013.01); *G03C 11/02* (2013.01); *B41M 2205/18* (2013.01); *G06F 17/30725* (2013.01); *B41J 3/4076* (2013.01)

(58) Field of Classification Search
   USPC ................................................. 358/1.14, 1.15
   See application file for complete search history.

(56) References Cited

U.S. PATENT DOCUMENTS

| | | | |
|---|---|---|---|
| 7,556,844 B2 | 7/2009 | Iftime et al. | |
| 2004/0220898 A1* | 11/2004 | Eguchi et al. | 707/1 |
| 2007/0058178 A1* | 3/2007 | Kurihara et al. | 358/1.2 |
| 2007/0211124 A1 | 9/2007 | Iftime et al. | |
| 2008/0087190 A1 | 4/2008 | Iftime et al. | |
| 2008/0220187 A1 | 9/2008 | Iftime et al. | |
| 2008/0310869 A1* | 12/2008 | Iftime et al. | 399/51 |
| 2009/0034997 A1* | 2/2009 | Edwards et al. | 399/45 |
| 2009/0200792 A1 | 8/2009 | Iftime et al. | |
| 2009/0212115 A1 | 8/2009 | Iftime et al. | |
| 2009/0214972 A1 | 8/2009 | Wosnick et al. | |
| 2010/0097661 A1* | 4/2010 | Hoblit | 358/405 |
| 2010/0321740 A1* | 12/2010 | Roof | 358/448 |
| 2011/0258177 A1* | 10/2011 | Wu et al. | 707/711 |

* cited by examiner

*Primary Examiner* — King Poon
*Assistant Examiner* — Andrew H Lam
(74) *Attorney, Agent, or Firm* — MH2 Technology Law Group LLP

(57) ABSTRACT

An embodiment generally relates to systems and methods for electronically auto-filing and retrieving erasable paper document documents configured for ultraviolet (UV) imaging. A device can embed a machine readable code on an erasable paper document, or can detect a machine readable code pre-printed on the document. An electronic version of the erasable paper document along with the machine readable code can be stored in a database. When the machine readable code is later detected on a rendered document, the electronic version corresponding to the machine readable code can be retrieved from storage. The erasable paper document can be re-rendered using the retrieved electronic version either as a new erasable paper document, for display to the user, or other renderings.

11 Claims, 5 Drawing Sheets

SYSTEMS AND METHODS FOR USING MACHINE READABLE CODES TO STORE AND RETRIEVE REVERSIBLE WRITE ERASEABLE PAPER DOCUMENTS

FIELD OF THE INVENTION

This invention relates generally to imaging and, more particularly, to systems and methods for using machine readable codes to store and retrieve reversible write erasable paper documents in an imaging system.

BACKGROUND OF THE INVENTION

Paper documents are often promptly discarded after being read. Although paper is relatively inexpensive, the quantity of discarded paper documents is enormous and the disposal of these discarded paper documents raises significant cost and environmental issues. In addition, it would be desirable that paper documents can be reusable, to minimize cost and environmental issues.

Photochromic paper, also known as erasable paper, provides an imaging medium that can be reused many times to transiently store images and documents. For example, photochromic paper employs photochromic materials to provide an imaging medium for containing desired images. Typically, photochromic materials can undergo reversible or irreversible photoinduced color changes in the photochromic containing imaging layer. In addition, the reversible photoinduced color changes enable image-writing and image-erasure of photochromic paper in sequence on the same paper. For example, an ultraviolet (UV) light source can be used for inducing image-writing, while a combination of heat and a visible light source can be used for inducing image-erasure. An inkless erasable imaging formulation is the subject of U.S. patent application Ser. No. 12/206,136 filed Sep. 8, 2008 and titled "Inkless Reimageable Printing Paper and Method" which is commonly assigned with the present application to Xerox Corp., and is incorporated in its entirety herein by reference. For brevity, in the rest of the disclosure, a document printed on erasable paper can be referred to as an "erasable paper document," and depending on the context, can refer to both the electronic and printed form.

The erasable paper can start to irreversibly fade over time. As such, erasable paper users or customers may not be able to use or see an erasable paper document once it has undergone a certain amount of fading. Further, erasable paper users or customers may be reluctant to use photochromic paper technology for fear that the erasable paper's content may not be recoverable if the erasable paper fades too much. There is no known method to prevent further fading of erasable paper or to bring back contrast to a fading erasable paper document. Therefore, it may be desirable to have systems and methods for retrieving erasable paper documents. It particular, it may be desirable to have systems and methods for using identification codes on rendered documents for the purpose of re-rendering erasable paper documents that have experienced fading.

SUMMARY

An embodiment pertains generally to a method of accessing documents. The method comprises identifying a machine readable code on a substrate configured to be rendered as an erasable paper document and scanning the machine readable code prior to rendering the erasable paper document. Further, the method comprises storing, on a server, an electronic version of the erasable paper document and the machine readable code, and rendering the erasable paper document on the substrate.

Another embodiment pertains generally to method of accessing documents. The method comprises identifying a document to be printed as an erasable paper document, and storing, on a server, an electronic version of the document. Further, the method comprises generating a machine readable code comprising an indication of the electronic version of the document, and rendering the erasable paper document, wherein the erasable paper document comprises the machine readable code embedded thereon.

A further embodiment pertains generally to a system for accessing documents. The system comprises a processor coupled to memory and configured to identify a machine readable code on a substrate configured to be rendered as an erasable paper document, and scan the machine readable code prior to rendering the erasable paper document. The processor is further configured to store, on a server, an electronic version of the erasable paper document and the machine readable code, and render the erasable paper document on the substrate.

A further embodiment pertains generally to a system for accessing documents. The system comprises a processor coupled to memory and configured to identify a document to be printed as an erasable paper document, and store an electronic version of the document. The processor is further configured to generate a machine readable code comprising an indication of the electronic version of the document, and render the erasable paper document, wherein the erasable paper document comprises the machine readable code embedded thereon.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
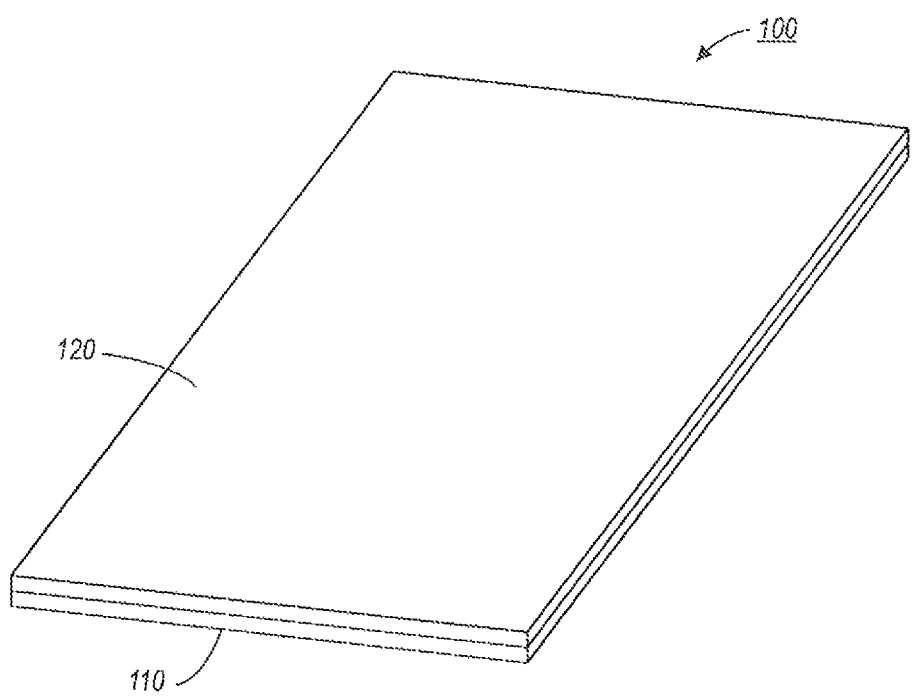
FIG. 1 is a perspective depiction of a transient document page having a photochromic coating which allows for writing an image in the coating on the page and for erasing an image from the coating in accordance with embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

As used herein, the term "erasable paper" refers to a transient or reversible write document that has the appearance and feel of traditional paper, including cardstock and other weights of paper. Erasable paper can be selectively imaged and erased.

As used herein, erasable paper refers to a medium upon which marks are made via an imaging process with the characteristic that the marks fade and ultimately disappear over a period of time. In one embodiment, ultraviolet (UV) imaging is used as the imaging process. Further, an imaged or rendered erasable paper refers to an erasable paper having a visible image thereon, the image a result of, for example, UV imaging the erasable paper. A non-imaged erasable paper refers to an erasable paper that has never been previously imaged, or erasable paper having an image erased therefrom and available for subsequent imaging. An exemplary erasable paper is described in connection with FIG. 1 below.

As used herein, the term "non-erasable" refers to a traditional medium of the type used in any conventional imaging such as ink jet, xerography, or liquid ink electrophotography, as known in the art. An example of a traditional medium can be paper.

As used herein, the term "medium" can include paper, substrate, or similar medium suitable for one or more of erasable paper imaging or conventional imaging.

Embodiments generally relate to systems and methods for using machine readable codes to locate and retrieve electronic versions of rendered erasable paper documents. More particularly, a retrieval module or other logic can store electronic versions of erasable paper documents in a database, memory, or other forms of storage. In embodiments, the printed or rendered versions of the erasable paper documents can have embedded machine readable codes that can be used to retrieve the electronic versions of the erasable paper documents.

FIG. 1 depicts an exemplary erasable medium 100 in accordance with embodiments. It should be readily apparent to one of ordinary skill in the art that the erasable medium 100 depicted in FIG. 1 represents a generalized schematic illustration and that other layers or materials can be added or existing layers or materials can be removed or modified.

As shown in FIG. 1, the erasable medium 100 can comprise a substrate 110 and a photochromic material 120 incorporated into or onto the substrate 110. The photochromic material 120 can provide a reversible writing erasable image-forming formulation on the substrate 110.

The substrate 110 can include, for example, any suitable material such as paper, glass, ceramic, wood, plastics, fabrics, textile products, polymeric films, inorganic substrates such as metals, and the like. The paper can include, for example, plain papers such as XEROX@ 4024 papers, ruled notebook paper, bond paper, and silica coated papers such as Sharp Company silica coated paper, Jujo paper, and the like. The substrate 110, such as a sheet of paper, can have a blank appearance.

In various embodiments, the substrate 110 can be made of a flexible material and can be transparent or opaque. The substrate 110 can be a single layer or multi-layer where each layer is the same or different material and can have a thickness, for example, ranging from about 0.05 mm to about 5 mm.

The photochromic material 120 can be impregnated, embedded or coated to the substrate 110, for example, a porous substrate such as paper. In various embodiments, the photochromic material 120 can be applied uniformly to the substrate 110 and/or fused or otherwise permanently affixed thereto.

Images formed in/on an erasable medium can be selectively or locally erased. In order to effect the transition from a visible image to an erased medium, radiant energy and/or heat can be applied to the imaged erasable medium at a temperature suitable for effecting the erasure. In embodiments, the temperature suitable for effecting the erasure can be, for example, above about 70° C., such as from about 80° C. to about 200° C. In an exemplary embodiment, the imaged erasable medium can be completely erased, for example, at about 160° C. or higher.

In embodiments, in order to image an original erasable medium or re-image the erased erasable medium, the erasable medium can be pre-heated to a temperature of about 55° C. or higher before writing, for example, using a radiant energy such as a UV exposure.

It will be appreciated that other types of erasable media, other than photochromic media, can be used in connection with the exemplary embodiments herein. Such types of erasable media are intended to be included within the scope of the disclosure.

In embodiments, the photochromic material 120 can include, for example, an inkless erasable imaging formulation as described in U.S. patent application Ser. No. 12/206, 136 filed Sep. 8, 2008 and entitled "Inkless Reimageable Printing Paper and Method," which is commonly assigned with the present application to Xerox Corp., and is incorporated in its entirety herein by reference.

Figure 2:
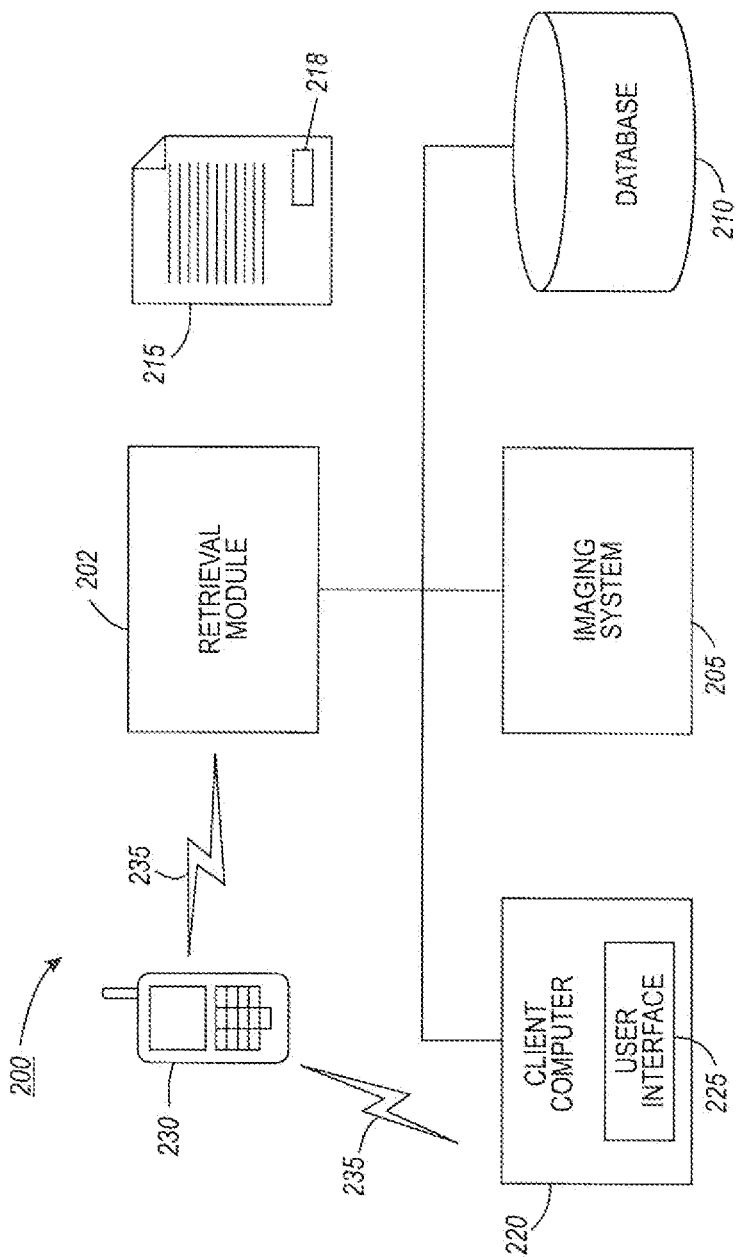
FIG. 2 illustrates an exemplary system for storing and retrieving erasable paper documents using machine readable codes in accordance with another embodiment.

FIG. 2 illustrates an exemplary system 200 of electronically auto-filing and retrieving erasable paper documents, according to embodiments. It should be appreciated that the system 200 as depicted in FIG. 2 is merely exemplary and other components and arrangements thereof are envisioned.

The system 200 can comprise a retrieval module 202, an imaging system 205, and a database 210. The retrieval module 202 can interface with the imaging system 205 and the database 210 and can comprise any processing, application, and/or memory capabilities for directing the operation of or carrying out the embodiments as described herein. In some embodiments, the retrieval module 202 can be incorporated into or separate from the imaging system 205. In some embodiments, the imaging system 205 can comprise multiple imaging devices, can be capable of imaging or printing erasable paper documents, such as erasable paper document 215, can be a standard imaging device, or can be a combination thereof.

According to embodiments, document substrates that are to be printed as erasable paper documents can comprise a machine readable code 218 printed or embedded thereon. For example, a production factory or other manufacturing center can preprint a plurality of machine readable codes on a plurality of document substrates. In embodiments, each machine readable code 218 embedded, imaged, or otherwise included on the erasable paper document 215 can serve to uniquely identify the corresponding erasable paper document 215 such as, for example, through the use of an electronic database such as the database 210. Further, in embodiments, the machine readable code 218 can be any code, marking, symbol, or other form of indication that can be used to identify documents.

According to further embodiments, the retrieval module 202 can direct the imaging system 205 or other resources to embed one or more machine readable codes 218 on documents to be printed as erasable paper documents, during the imaging process. For example, a machine readable code 218 can be embedded on a document substrate upon the imaging system 205 receiving a command to render the document substrate as the erasable paper document 215. In embodiments, the machine readable code 218 can be added to other content that is imaged or rendered on the erasable paper document 215.

The machine readable code 218 can be generated using standard imaging processes and data embedding techniques such as, for example, the "CMYK" color model, glyphs, visible or IR barcodes, invisible ink that is ultraviolet active, and specialty imaging features such as "UVMark", "IRMark," and any other techniques and processes. In embodiments, the technique used to embed the machine readable code 218 can be determined by one or more factors such as, for example, available space on the documents, design considerations, esthetics, and other factors.

The retrieval module 202 can directly transmit or direct the imaging system 205 or other resources to transmit an electronic version of the erasable paper document 215 to the database 210 for storage. In embodiments, the electronic version of the erasable paper document 215 can be transmitted to and stored on any local or remote storage that can be accessed by any imaging system or device. Further, in embodiments, the imaging system 205 can automatically generate an electronic version of the erasable paper document 215 for storage, e-filing, and the like before, during, or after the imaging system 205 renders the erasable paper document 215. For example, a print driver of the imaging system 205 can generate both the electronic version of the erasable paper document 215 and a version of the erasable paper document 215 to be rendered on erasable paper.

In embodiments, the electronic version of the erasable paper document 215 can be specified with a "fade duration" over which the electronic version persists in the database 210 or other resources. In some embodiments, the electronic version can be purged from the database 210 upon expiration of the fade duration. In embodiments, the fade duration can be a set amount of time or can be customized by a user, logic, or other entity to be shorter, the same, or longer than the optical fade duration of the erasable paper document 215 itself.

It should be appreciated that the database 210 can be searchable and can be any form of server, memory, database, cloud-based resource, or other storage device or component. In embodiments, the database 210 can be accessible via user accounts associated with online service or cloud-based resources such as, for example, Amazon® S3 Cloud®, Google® Docs, MobileMe® iDisk®, Docushare®, or any other service. In other embodiments, one or more users and/or administrators can specify secure access to the database 210 and other components via the retrieval module 202, the imaging system 205, or desktop, web, or print driver interfaces, or other interfaces.

According to embodiments, the imaging system 205 or another device can be configured to scan the machine readable code 218 of the erasable paper document 215. In embodiments, the machine readable code 218 can be scanned on the erasable paper or the machine readable code 218 can be generated and inserted, embedded, or included onto the erasable paper document 215 when the erasable paper document 215 is being imaged. For example, the machine readable code 218 can be read before the transient content is imaged on the erasable paper document 215. The retrieval module 202 or other logic can transfer an identification of the machine readable code 218 to the database 210 or other storage. In embodiments, the identification of the machine readable code 218 and the electronic version of the erasable paper document 215 can be stored together in the database 210, or can be stored separate in the database 210 and/or other storage devices.

In embodiments, the retrieval module 202 can establish a one-to-one correspondence between the machine readable code 218 of the erasable paper document 215 and the electronic version of the erasable paper document 215. In particular, the retrieval module 202 can generate an association between the machine readable code 218 and a location in the database 210 at which the electronic version of the erasable paper document 215 is stored. The retrieval module 202 can store an indication of the correspondence locally, in the database 210, at a central location accessible by other devices, or on other resources. In embodiments, the retrieval module 202 can generate a dynamic code to be imaged on the erasable paper document 215 when the erasable paper document 215 itself is imaged. The dynamic code can comprise an indication of the storage location of the electronic version of the erasable paper document 215 in the database 210. In embodiments, the dynamic code can have a different contrast than the other content of the erasable paper document 215 such that the dynamic code can fade slower than the content of the erasable paper document 215.

In embodiments, a user, administrator, or other entity can desire to retrieve the electronic version of the erasable paper document 215 from the database 210. For example, the erasable paper document 215 may have some or all of its content partially or completely faded. The user, administrator, or other entity can scan the erasable paper document 215 through the imaging system 205 or other device that can read the machine readable code 218. The retrieval module 202 can receive the machine readable code 218 of the scanned erasable paper document 215 from the imaging system 205 and can use the machine readable code 218 in combination with the one-to-one correspondence to locate and retrieve the corresponding electronic version of the erasable paper document 215 from the database 210.

In embodiments, a user, administrator, or other entity can manually input the machine readable code 218 into a client computer 220 via, for example, a user interface 225. The client computer 220 can interface with the retrieval module 202 to use the inputted machine readable code 218 and one-to-one correspondence to locate and retrieve the corresponding electronic version of the erasable paper document 215 from the database 210. In embodiments, the client computer 220 can be any computing device or hardware capable of interfacing with the retrieval module 202 or other logic. In some embodiments, the client computer 220 can be incorporated into or separate from the imaging system 205.

In other embodiments, a user, administrator, or other entity can use a device 230 such as, for example, a smart phone, personal digital assistant (PDA), tablet device, laptop, or any other device, to scan or capture an image of the machine readable code 218. For example, the machine readable code 218 can be a QR Code readable by a QR barcode reading device. In embodiments, the device 230 can transmit the detected machine readable code 218 to the client computer 220, retrieval module 202, imaging system 205, or other resource via a network such as a wireless or cellular data network 235, or other networks.

The retrieval module 202 or other logic can direct the imaging system 205 or other resources to re-render the electronic version of the erasable paper document 215. In embodiments, the imaging system 205 can use the electronic version to image a new copy of the erasable paper document 215 either as another erasable paper document or as a standard document. In embodiments, the retrieval module 202 can retrieve and/or render the whole or a partial amount of the electronic version of the erasable paper document 215. In other embodiments, the retrieval module 202 can transmit the electronic version of the erasable paper document 215 to the client computer 220 or the device 230, or other resources, for virtual viewing on, for example, the user interface 225 or a display screen of the device 230. Upon viewing the electronic version of the erasable paper document 215, a user, administrator, or other entity of the client computer 220, the device 230, or other resource can select to render the erasable paper document 215 by, for example, imaging a new copy of the erasable paper document 215 on the imaging system 205. In embodiments, a user, administrator, or other entity can specify to have the electronic version of the erasable paper document 215 converted into an editable format compatible with word processing applications, or other formats.

In embodiments, the erasable paper document 215 can be rendered by incorporating value-added information into the electronic version or a new copy of the erasable paper document 215. For example, the retrieval module 202 or other logic can add personalized or content-based advertising, or other information, to the erasable paper document 215. In embodiments, the electronic version of the erasable paper document 215 can comprise information about how the original erasable paper document 215 was imaged so that an exact replication of the erasable paper document 215 can be rendered.

For security purposes, a user, administrator, or other entity can manually erase or cause a resource, such as the imaging system 205, to erase any residual marked content on the erasable paper document 215, such as the machine readable code 218. In embodiments, upon erasing the machine readable code 218 from the erasable paper document 215, the retrieval module 202 or other logic can erase the electronic version of the erasable paper document 215 stored in the database 210. In other embodiments, before erasing the electronic version of the erasable paper document 215, a user, administrator, or other entity can have the option to save the electronic version, the one-to-one correspondence information, or other information, to another location.

Figure 3:
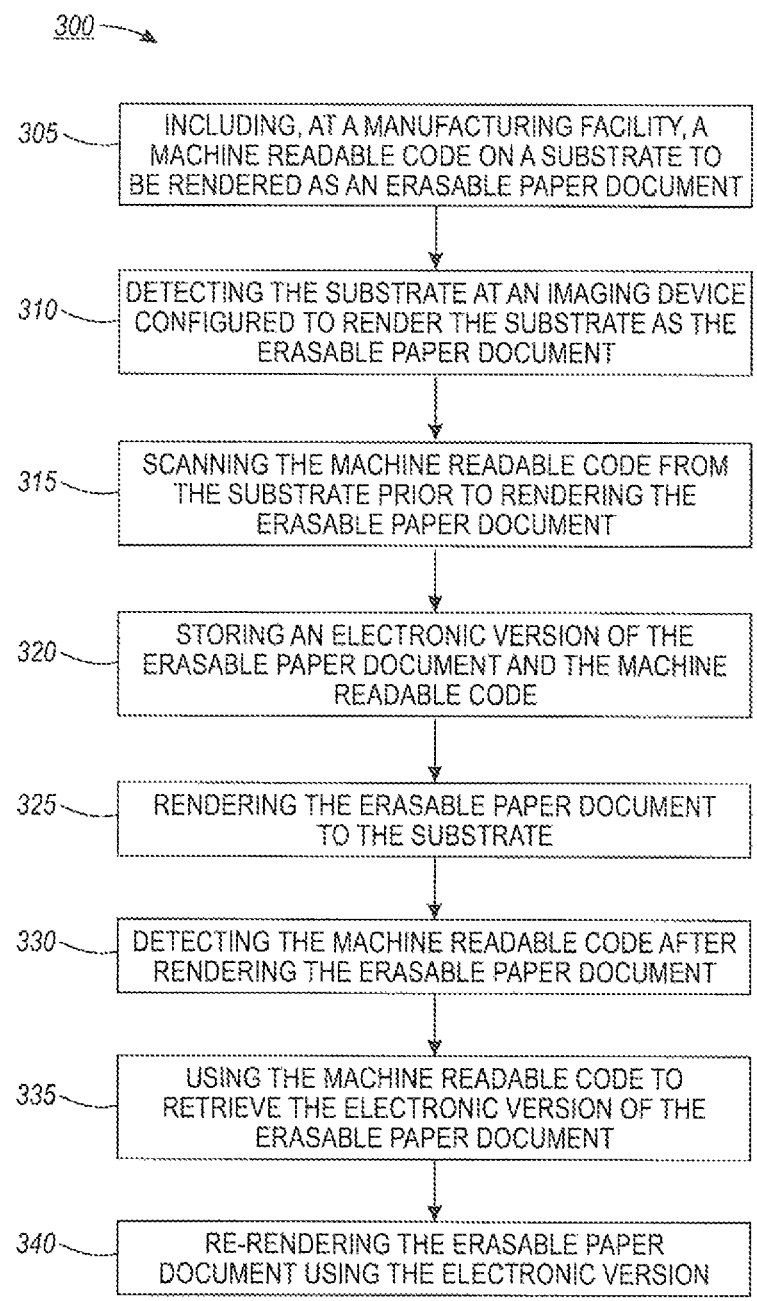
FIG. 3 illustrates an exemplary flow diagram of accessing erasable paper documents using machine readable codes in accordance with embodiments.

FIG. 3 illustrates an exemplary flow diagram 300 implemented by systems and methods in accordance with embodiments. It should be readily apparent to those of ordinary skill in the art that the flow diagram 300 depicted in FIG. 3 represents a generalized illustration and that other steps can be added or existing steps can be removed or modified.

In 305, a manufacturing facility or the like can include a machine readable code on a substrate to be rendered as an erasable paper document. In embodiments, a unique machine readable code can be printed or embedded on each substrate produced by the manufacturing facility. In 310, the substrate can be detected at an imaging device configured to render the substrate as the erasable paper document. In embodiments, the imaging device can be a printer, multifunction device, or any other imaging device. In 315, the machine readable code can be scanned from the substrate prior to rendering the erasable paper document. In embodiments, the machine readable code can be scanned in response to the imaging device receiving a request to render the erasable paper document.

In 320, an electronic version of the erasable paper document as well as the machine readable code can be stored. In embodiments, the electronic version and the machine readable code can be stored on a server, database, or any other type of memory. In 325, the erasable paper document can be rendered on the substrate using known techniques. In 330, the machine readable code can be detected after rendering the erasable paper document. In embodiments, the machine readable code can be detected via the imaging device that originally rendered the erasable paper document or via a desktop, print-driver, web interface, or other mechanisms, such as a mobile device.

In 335, the machine readable code can be used to retrieve the electronic version of the erasable paper document. In embodiments, the electronic version can be retrieved using a one-to-one correspondence established between the machine readable code and the electronic version. In 340, the erasable paper document can be re-rendered using the electronic version. In embodiments, the rendering can comprise imaging the electronic version to a hardcopy device (e.g. an erasable paper or standard imaging device), an electronic or web portal, a viewing device, or other rendering vehicles. In other embodiments, the rendering can comprise incorporating information into the rendered electronic version, such as personalized information, content-based pop-up advertisements, and other information. In further embodiments, the electronic version of the erasable paper document can be converted to an editable format compatible with a word processing application.

Figure 4:
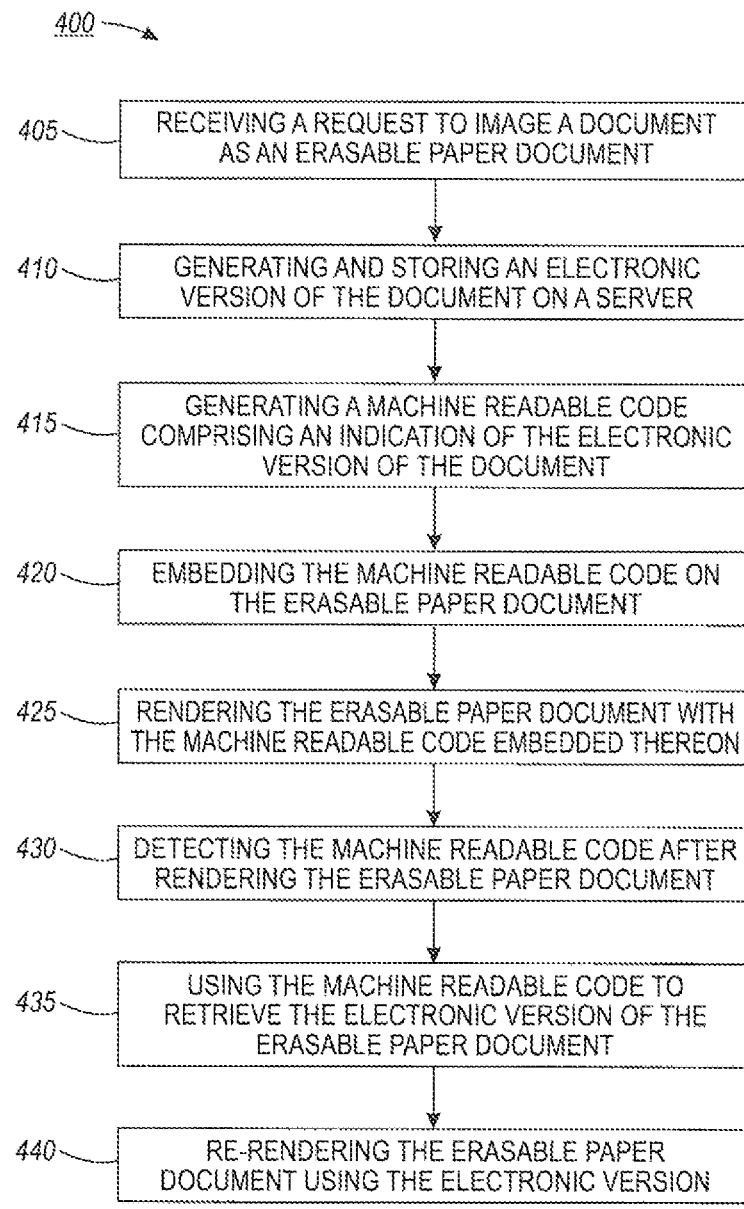
FIG. 4 illustrates an exemplary flow diagram of accessing erasable paper documents using machine readable codes in accordance with embodiments.

FIG. 4 illustrates an exemplary flow diagram 400 implemented by systems and methods in accordance with embodiments. It should be readily apparent to those of ordinary skill in the art that the flow diagram 400 depicted in FIG. 4 represents a generalized illustration and that other steps can be added or existing steps can be removed or modified.

In 405, a request to imaging a document as an erasable paper document can be received. In embodiments, the request can be received from a client computer at an imaging device configured to render erasable paper documents. In 410, an electronic version of the document can be generated and stored on a server. In embodiments, the server can be local to or remote from the imaging device, and can be accessed by other devices via one or more networks.

In 415, a machine readable code comprising an indication of the electronic version of the document can be generated. In embodiments, the machine readable code can uniquely identify the erasable paper document to be rendered. In 420, the machine readable code can be embedded on the erasable paper document. In embodiments, the machine readable code can generated and embedded using standard imaging processes and data embedding techniques such as, for example, the "CMYK" color model, glyphs, visible or IR barcodes, invisible ink that is ultraviolet active, and specialty imaging features such as "UVMark", "IRMark," and any other techniques and processes.

In 425, the erasable paper document with the machine readable code embedded thereon can be rendered using known techniques. In 430, the machine readable code can be detected after rendering the erasable paper document. In embodiments, the machine readable code can be detected via the imaging device that originally rendered the erasable paper document or via a desktop, print-driver, web interface, or other mechanisms, such as a mobile device.

In 435, the machine readable code can be used to retrieve the electronic version of the erasable paper document. In embodiments, the electronic version can be retrieved using the indication or a one-to-one correspondence established between the machine readable code and the electronic version. In 440, the erasable paper document can be re-rendered using the electronic version. In embodiments, the rendering can comprise imaging the electronic version to a hardcopy device (e.g. an erasable paper or standard imaging device), an electronic or web portal, a viewing device, or other rendering vehicles. In other embodiments, the rendering can comprise incorporating information into the rendered electronic version, such as personalized information, content-based pop-up advertisements, and other information. In further embodiments, the electronic version of the erasable paper document can be converted to an editable format compatible with a word processing application.

Figure 5:
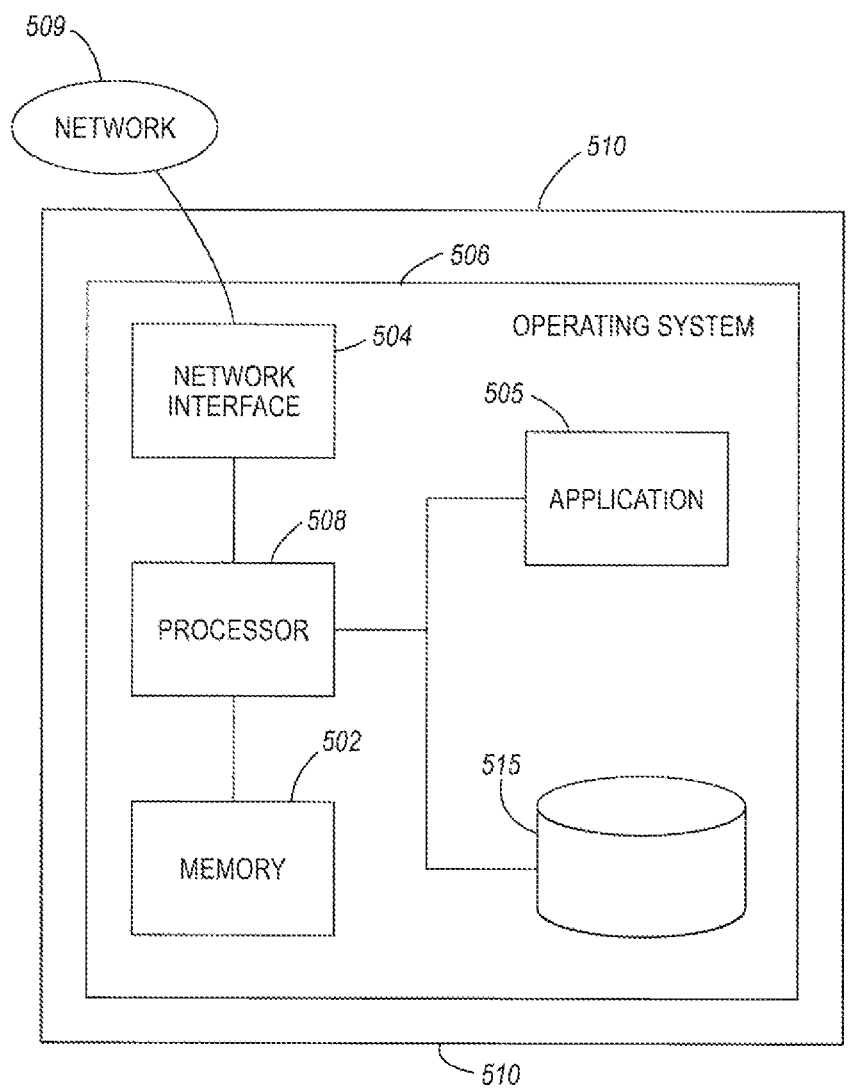
FIG. 5 illustrates a hardware diagram in accordance with another embodiment.

FIG. 5 illustrates an exemplary diagram of hardware and other resources that can be incorporated with processing and logic associated with the present embodiments. As shown in FIG. 5, a server 510 can be configured to communicate with a network 509. In embodiments as shown, the server 510 can comprise a processor 508 communicating with memory 502, such as electronic random access memory, or other forms of transitory or non-transitory computer readable storage mediums, operating under control of or in conjunction with an operating system 506. The operating system 506 can be any commercial, open-source, or proprietary operating system or platform. The processor 508 can communicate with a database 515, such as a database stored on a local hard drive. While illustrated as a local database in the server 510, the database 515 can be separate from the server 510.

The processor 508 can further communicate with a network interface 504, such as an Ethernet or wireless data connection, which in turn communicates with the network 509, such as the Internet or other public or private networks. The processor 508 can also communicate with the database 515 or any applications 505, such as applications associated with the retrieval module 202, to execute control logic and perform the generation and detection of machine readable codes, and e-filing of electronic versions of erasable paper documents, as described herein.

While FIG. 5 illustrates the server 510 as a standalone system comprising a combination of hardware and software, the server 510 can also be implemented as a software application or program capable of being executed by a conventional computer platform. For example, it should be understood that the components of the server 510 can be implemented on user PCs or other hardware such that the user PCs can communicate directly with the database 515. Likewise, the server 510 can also be implemented as a software module or program module capable of being incorporated in other software applications and programs. In either case, the server 510 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of accessing documents, the method comprising:
    receiving a selection from a user that content to be printed is to printed on an erasable paper document;
    saving the content in a database for a fixed time period based on the receiving the selection;
    obtaining a machine readable code printed on a substrate of the erasable paper document, wherein the machine readable code uniquely identifies content to be rendered on the erasable paper document;
    determining that content that was previously rendered as transient content on the erasable paper document has faded;
    obtaining, on a server, an electronic version of the content based on the machine readable code based on the determining and additional value-added information to be rendered on the erasable paper document;
    causing, by the server, the electronic version to be displayed on a display that is viewable by the user, wherein the electronic version comprises information indicative of how a previous version of the erasable paper document was imaged;

receiving a determination that the electronic version is approved for printing from the user;

rendering the content and the additional value-added information based on the determination that was received that was obtained on the server as transient content on the erasable paper document;

rendering a dynamic code on the erasable paper document, wherein the dynamic code comprises an indication of a storage location of the electronic version of the erasable paper document in the database, wherein the dynamic code comprises a code rendered in invisible ink that becomes readable when exposed to ultraviolet light; and deleting the electronic version of the content from the storage location after a predetermined amount of time.

2. The method of claim 1, further comprising rendering the content as transient content on the erasable paper document using ultraviolet (UV) imaging.

3. The method of claim 1, further comprising:
printing the machine readable code with ink on the substrate using a method selected from the group consisting of CMYK color model and invisible ink to uniquely identify the substrate; and
the rendering of the content as transient content comprises imaging the transient content within a photochromic material.

4. The method of claim 1, further comprising storing the electronic version of the content and the machine readable code by establishing a correspondence between the machine readable code and a storage location of the electronic version of the content.

5. The method of claim 4, further comprising:
detecting an indication of the machine readable code from the substrate after rendering the transient content on the erasable paper document and after the transient content is no longer visible;
retrieving the electronic version of the content in response to detecting the indication; and
re-rendering the electronic version of the content as transient content on an erasable paper substrate.

6. The method of claim 5, wherein retrieving the electronic version of the content comprises:
examining the correspondence between the machine readable code and the storage location of the electronic version of the content; and
retrieving the electronic version of the content from the storage location.

7. A system for accessing documents, the system comprising:
a processor coupled to memory and configured to perform actions comprising:
receiving a selection from a user that content to be printed is to printed on an erasable paper document;
saving the content in a database for a fixed time period based on the receiving the selection;
obtaining a machine readable code printed on a substrate of the erasable paper document, wherein the machine readable code uniquely identifies content to be rendered on the erasable paper document;
determining that content that was previously rendered as transient content on the erasable paper document has faded;
obtaining, on a server, an electronic version of the content based on the machine readable code based on the determining and additional value-added information to be rendered on the erasable paper document;
causing, by the server, the electronic version to be displayed on a display that is viewable by the user, wherein the electronic version comprises information indicative of how a previous version of the erasable paper document was imaged;
receiving a determination that the electronic version is approved for printing from the user;
rendering the content and the additional value-added information based on the determination that was received that was obtained on the server as transient content on the erasable paper document;
rendering a dynamic code on the erasable paper document, wherein the dynamic code comprises an indication of a storage location of the electronic version of the erasable paper document in the database, wherein the dynamic code comprises a code rendered in invisible ink that becomes readable when exposed to ultraviolet light; and
deleting the electronic version of the content from the storage location after a predetermined amount of time.

8. The system of claim 7, wherein;
the machine readable code is printed on the substrate with a CMYK ink and invisible ink to uniquely identify the substrate; and
the transient content is imaged within a photochromic material.

9. The system of claim 7, wherein the processor is further configured to perform actions comprising storing the electronic version of the content and the machine readable code by establishing a correspondence between the machine readable code and a storage location of the electronic version of the content.

10. The system of claim 9, wherein the processor is further configured to perform actions comprising:
detecting an indication of the machine readable code from the substrate after rendering the transient content on the erasable paper document and after the transient content is no longer visible; and
retrieving the electronic version of the content in response to detecting the indication; and
re-rendering the electronic version of the content as transient content on an erasable paper substrate.

11. The system of claim 10, wherein retrieving the electronic version of the content comprises:
examining the correspondence between the machine readable code and the storage location of the electronic version of the content; and
retrieving the electronic version of the content from the storage location.

\* \* \* \* \*